May 24, 1949.  J. A. BIERWIRTH ET AL  2,471,089
DOOR HOOK
Filed Dec. 26, 1947
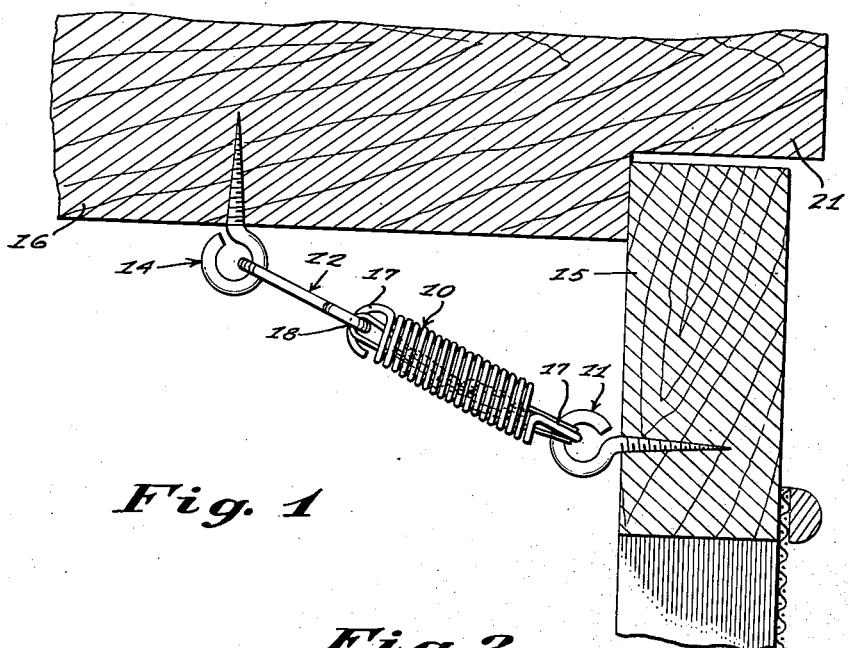
*Fig. 1*
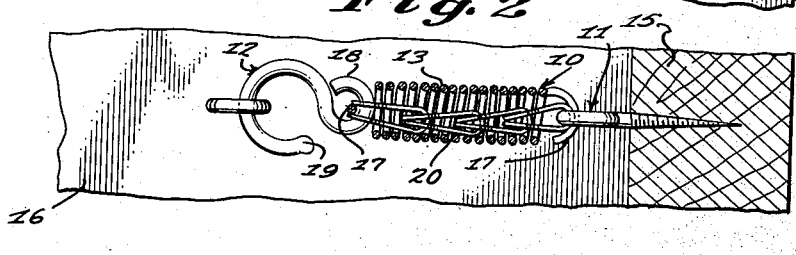
*Fig. 2*
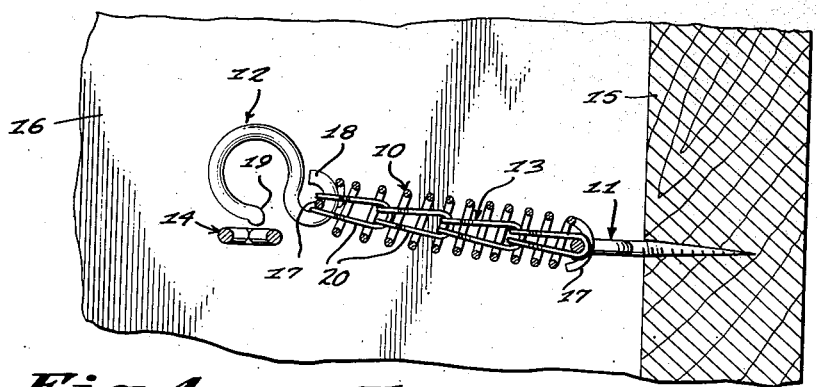
*Fig. 4*  *Fig. 3*
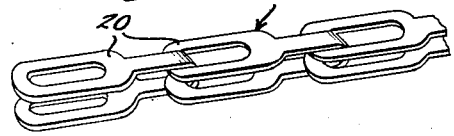
INVENTORS
JOHN A. BIERWIRTH AND
BY FRITZ KLAEDEN
McMorrow, Berman & Davidson
ATTORNEYS Patented May 24, 1949

2,471,089

UNITED STATES PATENT OFFICE 2,471,089

DOOR HOOK

John A. Bierwirth and Fritz Klaeden, Austin, Tex.

Application December 26, 1947, Serial No. 793,976

2 Claims. (Cl. 292—114)

This invention relates to improvements in door hooks, and more particularly to an improved flexible or resilient hook for a door or other closure.

It is among the objects of the invention to provide an improved hook for a door or other closure, which hook is resiliently flexible to hold the closure in tightly-shut condition, has a limited amount of stretch with a positive limit stop so that the closure cannot be forced open while the hook is in operative locking condition, is so constructed that it cannot accidentally lock when the door is closed, cannot be released by a thin tool inserted between the door and door jamb from outside the door, and which is of simple, durable and economical construction and neat and attractive in appearance.

Other objects and advantages will become apparent from a consideration of the following description in conjunction with the accompanying drawing, wherein:

Figure 1 is a plan view of a hook assembly illustrative of the invention shown in operative association with a door and wall illustrated in fragmentary cross-sectional view;

Figure 2 is an elevation of the hook assembly and wall fragment shown in Figure 1, the hook spring and door fragment being shown in cross-section;

Figure 3 is a view similar to Figure 2 showing the hook assembly in stretched or extended condition for engagement of the hook with an associated screw eye;

Figure 4 is a perspective view of a fragmentary portion of a chain constituting a component of the improved hook assembly.

With continued reference to the drawing, in which like numerals are used to designate the same parts throughout the several views, the improved hook assembly comprises, in general, a coiled tension spring 10, a screw eye 11 pivotally connected to one end of the spring, a hook 12 pivotally connected to the opposite end of the spring, a flexible strand 13 connected at its opposite ends to the hook and the screw eye, and a screw eye 14 for engagement by the hook 12.

As illustrated, the screw eye 11 is set into the door 15 and the screw eye 14 is set into the wall 16, but this arrangement may be reversed, if desired, without affecting the utility of the assembly. Spring 10 may be a plain wire spring of coiled cylindrical form of a length substantially equal to the shank length of a conventional door hook and having its end portions bent substantially at right angles to its coils to provide U-shaped hooks 17 at the opposite ends thereof. One of these hooks is engaged in the eye of screw eye 11 and the other is engaged in an eye 18 formed on hook 12.

Hook 12 may be conveniently formed of heavy wire and is partly circular in shape, having an angular extent materially greater than a semicircle. As illustrated, the rounded hook end 19 is spaced from the hook eye 18 by an amount sufficient only for the free passage of the wire of screw eye 14 therethrough.

Strand 13 is illustrated as a chain of flat, slotted links 20 of U-shaped form interconnected by having the bight portion of one link received in slots in the legs of an adjacent link. The slots are elongated so that the links may telescope relative to each other when the chain is unstretched. One end link receives the eye of screw eye 11 and the other end link receives the eye 18 of hook 12, so that the opposite ends of the chain are pivotally secured to the screw eye and the hook.

The chain has a length when stretched greater than the unstretched length of spring 10 by an amount substantially equal to the inside diameter of the hook so that the spring can be stretched to bring the hook into position to insert its rounded end 19 in the eye of screw eye 14, as shown in Figure 3, and when released will bring the screw eye to the outer side of the hook, as shown in Figure 2, and will exert a resilient closing force on the door. The length of the chain is not sufficient, however, to permit moving the edge of the door out of its seat in the door jamb 21.

While the flexible strand has been shown as a special form of chain, other forms such as different chains, a cable, or a link, may be used without in any way exceeding the scope of the invention.

The screw eyes 11 and 14 may be of conventional form, and a detailed description is not considered necessary for the purposes of the present disclosure.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:

1. A closure hook assembly comprising a coiled tension spring, a screw eye pivotally secured to one end of said spring, a hook pivotally secured to the opposite end of said spring, and a flexible strand extending through said spring and secured at its opposite ends to said screw eye and said hook, said hook being partly circular in form with an angular extent of more than a semi-circle and having a spring-receiving eye on one end thereof, and said strand having a length when stretched greater than the unstretched length of said spring by an amount substantially equal to the inside diameter of said hook.

2. A closure hook assembly comprising a coiled tension spring, a screw eye pivotally secured to one end of said spring, a hook having a spring-receiving eye pivotally secured to the opposite end of said spring, and a flexible strand extending through said spring and connected at its opposite ends to said screw eye and said hook eye, said hook being partly circular in form and having an angular extent greater than a semi-circle and said strand comprising a chain of flat, slotted, interconnected links having a length when stretched greater than the unstretched length of said spring by an amount substantially equal to the inside diameter of said hook.

JOHN A. BIERWIRTH.
FRITZ KLAEDEN.

REFERENCES CITED

The following references are of record in the file of this patent:

UNITED STATES PATENTS

| Number | Name | Date |
|---|---|---|
| 726,534 | Hillicott | Apr. 28, 1903 |
| 1,771,299 | Justus | July 22, 1930 |